May 12, 1931. W. S. VALMORE 1,804,721
VALVE MECHANISM
Filed Sept. 21, 1928

Inventor
William S. Valmore
By Hull Broch & West
Attorney

Patented May 12, 1931

1,804,721

UNITED STATES PATENT OFFICE

WILLIAM S. VALMORE, OF MANSFIELD, OHIO

VALVE MECHANISM

Application filed September 21, 1928. Serial No. 307,508.

This invention relates to a valve mechanism and is particularly adapted for use in controlling the flow of gases and liquids which have a high vapor tension and which gasify at normal pressure and temperature.

The main object of the invention is to provide a valve mechanism which requires no packing or glands and which will effectively prevent leakage of volatile liquids.

Another object of the invention is to provide a valve of the character described which comprises few parts which are readily assembled and disassembled and which is well adapted for quantity production at comparatively low cost.

A still further object of the invention is to provide a valve mechanism in which the valve proper is moved to closed position by means which includes a flexible metallic diaphragm, there being a friction disk disposed between the valve stem and diaphragm to prevent wear of the diaphragm.

Figure 1:
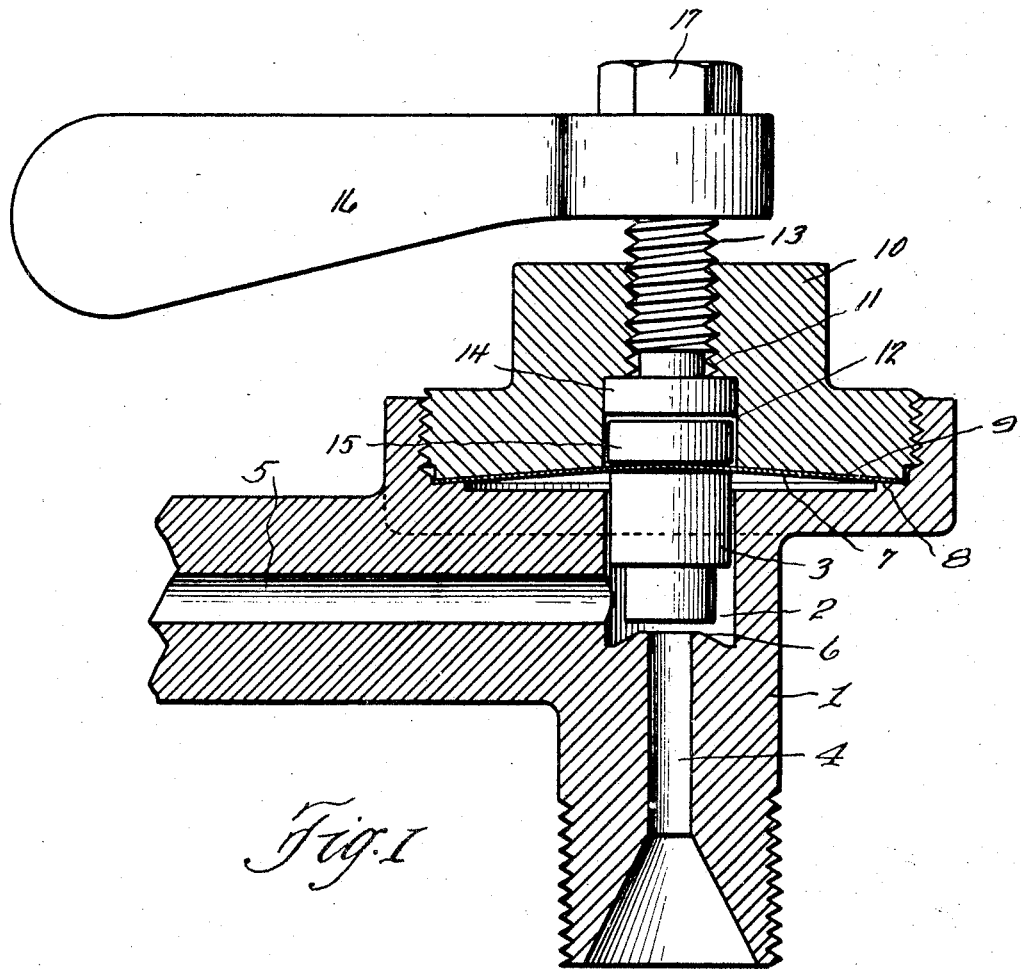
Figure 2:
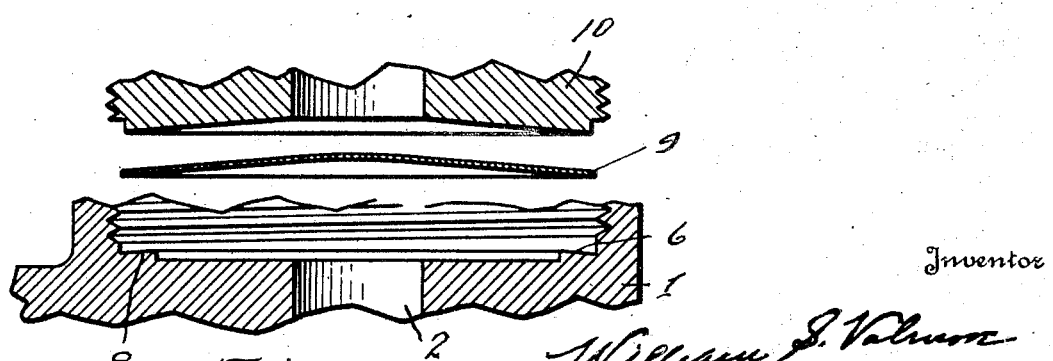

Further and more limited objects of the invention will appear as the description proceeds and by reference to the accompanying drawings in which Fig. 1 is a vertical sectional view of the valve body and valve actuating mechanism and Fig. 2 is a fragmentary vertical sectional view with parts disassembled to show the manner of securing the diaphragm in place.

Referring now to the drawings the reference character 1 designates the valve body having a centrally disposed cylindrical valve chamber 2 in which is loosely mounted a cylindrical valve 3. Leading into the valve chamber 2 is an inlet passageway 4 and leading from the valve chamber 2 is an outlet passageway 5. The inlet passageway 4 is provided with an upstanding annular portion defining a valve seat 6 against which the valve 3 seats. The valve body is also provided with an annular chamber 7 which is interiorly threaded and provided with a cylindrical inwardly extending shoulder 8 the upper surface of which is inclined at a slight angle so as to provide a seat for a flexible dish shaped diaphragm 9 which rests thereon and is secured in place by a valve bonnet 10 which is threadedly secured within the diaphragm chamber 7. The inner face of the valve bonnet or center piece 10 is dished outwardly to conform to the general contour of the diaphragm 9 and serves to reinforce the diaphragm when pressure is exerted thereon from below, as when the valve is opened. Extending through the valve bonnet 10 is a bore 11 which terminates in a cylindrical chamber 12. The upper or outer end of the bore 11 is threaded to receive a valve stem 13 therethrough the inner end of which terminates in an enlarged portion 14. Resting loosely in the cylindrical chamber 12 is a friction disk 15 of soft metal which is disposed between the valve stem and the diaphragm. An operating handle 16 is non rotatably secured to the valve stem 13 and held thereon by a nut 17. When it is desired to close the valve so as to cut off flow through the passageways 4 and 5, the valve stem 13 is screwed inwardly against the friction disk 14 whch bears against the diaphragm 9 to flex the same inwardly to move the valve 3 against its seat 6.

It will now be clear that I have provided a valve mechanism for the purpose set forth in which all packing and glands are omitted and which will accomplish the objects of the invention as hereinbefore stated. Various changes may be made in the details of construction and arrangement of parts without departing from the spirit of my invention and it is to be understood that my invention is limited only in accordance with the scope of the appended claims.

Having thus described my invention, what I claim is:

1. In a valve mechanism of the character described the combination of a valve body having a valve chamber having an inlet passageway and an outlet passageway leading therefrom, a valve disposed within said valve chamber, said valve body having an annular inclined diaphragm seat formed thereon, a diaphragm secured on said diaphragm seat, a valve bonnet secured in said valve body and holding said diaphragm against its seat and a valve actuating member carried by said valve bonnet and adapted to be actuated to flex said diaphragm to move said valve to closed position.

2. In a valve mechanism of the character described, the combination of a valve body having a cylindrical chamber therein and provided with an annular inwardly extending shoulder, the upper surface of which is inclined at a slight angle and forms a diaphragm seat, said valve body being also provided with a valve chamber having a pair of bores leading therefrom, a valve disposed within said valve chamber and adapted to close one of said bores, a slightly dished diaphragm arranged on said diaphragm seat, a valve bonnet securing said diaphragm in place and having a face of the same general contour as said diaphragm, a valve stem extending through said valve bonnet and adapted to flex said diaphragm to close said valve.

3. In a valve mechanism of the character described, the combination of a valve body having a cylindrical chamber therein and provided with an annular inwardly extending shoulder, the upper surface of which is inclined at a slight angle and forms a diaphragm seat, said valve body being also provided with a valve chamber having a pair of bores leading therefrom, a valve disposed within said valve chamber and adapted to close one of said bores, a slightly dished diaphragm arranged on said diaphragm seat, a valve bonnet securing said diaphragm in place and having a face of the same general contour as said diaphragm, a valve stem extending through said valve bonnet and adapted to flex said diaphragm to close said valve, and a friction disk interposed between said valve stem and diaphragm.

In testimony whereof, I hereunto affix my signature.

WILLIAM S. VALMORE.